United States Patent [19]
Yamamoto

[11] Patent Number: 5,379,640
[45] Date of Patent: Jan. 10, 1995

[54] SEMICONDUCTOR ACCELERATION DETECTING APPARATUS

[75] Inventor: Masahiro Yamamoto, Itami, Japan

[73] Assignee: Mitsubishi Denki Kabushiki Kaisha, Tokyo, Japan

[21] Appl. No.: 44,003

[22] Filed: Apr. 8, 1993

[30] Foreign Application Priority Data

Sep. 9, 1992 [JP] Japan .................................. 4-240586

[51] Int. Cl.⁶ .................................................. G01P 15/12
[52] U.S. Cl. ................................. 73/517 AV; 73/493; 73/517 R
[58] Field of Search .......... 73/517 R, 517 AV, 517 B, 73/493, 516 R; 338/2, 5

[56] References Cited

U.S. PATENT DOCUMENTS

| | | | |
|---|---|---|---|
| 4,592,235 | 6/1986 | Fink | 73/517 R |
| 5,005,414 | 4/1991 | Holland | 73/517 R |
| 5,085,079 | 2/1992 | Holdren | 73/517 R |
| 5,138,414 | 8/1992 | Shinohara | 73/517 R |

Primary Examiner—Thomas P. Noland
Assistant Examiner—Christine K. Oda
Attorney, Agent, or Firm—Leydig, Voit & Mayer

[57] ABSTRACT

A semiconductor acceleration detecting device has an acceleration detecting beam which is cantilevered from lead pins rather than by a base member, thus attaining a direct connection between the lead pins and the acceleration detecting beam without any intermediate wiring. The number of parts is reduced by virtue of elimination of base member and the wires, so that the number of steps of the assembly process is also reduced.

3 Claims, 3 Drawing Sheets

SEMICONDUCTOR ACCELERATION DETECTING APPARATUS

BACKGROUND OF THE INVENTION

1. Field of the Invention

The present invention relates to a semiconductor acceleration detecting apparatus and, more particularly, to a semiconductor acceleration detecting apparatus which is suitable for use in automobiles and which is composed of fewer parts and, hence, is easy to assemble.

DESCRIPTION OF THE RELATED ART

FIG. 3 is a sectional side view of a conventional semiconductor acceleration detecting device. Referring to the figure, the acceleration detecting device has an acceleration detecting beam 1 which is secured at one end to a base 2 and cantilevered from the base 2. The base 2 is fixed to a substrate 4 of the device which is constructed as a package. A weight 3 is attached to the free end of the acceleration detecting beam 1 so as to enhance the acceleration detecting sensitivity. A groove is formed in the surface of the acceleration detecting beam 1 secured to the base 2, so that the acceleration detecting beam 1 locally has a thin walled portion, i.e., a diaphragm 9. A gauge resistor 10 is formed on the opposite side of the diaphragm 9 from the groove.

An electrical signal from the gauge resistor 10 of the acceleration detecting beam 1 is transmitted to a lead pin 7 via a wire 8 which is connected, through a wire not shown, to the acceleration detecting beam 1. The lead pin 7 is connected to the substrate 4 through an insulating member made of an insulating material such as a glass. A cap 5 is provided on the substrate 4 so as to form the package mentioned above. The cavity inside the package is filled with a viscous oil 6 which provides a damping effect against impacts.

The operation of the known semiconductor acceleration detecting device having the described construction is as follows. When acceleration to be detected is applied in the direction which is directed towards the substrate 4 from the same side as the cap 5, the acceleration detecting beam 1 is resiliently flexed so that stresses are concentrated at the diaphragm 9. The gauge resistor 10 on the reverse side of the diaphragm 9 forms one side of a bridge circuit and has a piezoresistive property and varies in resistance value in accordance with the stress applied thereto. Consequently, an imbalance occurs in the bridge circuit so that a potential difference appears in the bridge circuit. This potential difference is picked up as an electrical signal indicative of the acceleration. This electrical signal is led outside the acceleration detecting device through the wire 8 and via the lead pin 7.

In this known semiconductor acceleration detecting apparatus, the gauge resistor 10 is connected to the lead pin 7 by means of the wire 8. In addition, it is necessary to bond the acceleration detecting beam 1 to the base 2 and also to bond the base 2 to the substrate 4. Consequently, laborious work having a number of steps is required to assemble this acceleration detecting device, due to the use of a large number of parts or components.

SUMMARY OF THE INVENTION

Accordingly, an object of the present invention is to provide a semiconductor acceleration detecting device which is composed of fewer components and, hence, is easy to assemble, thereby overcoming the above-described problem of the prior art.

To this end, according to the present invention, there is provided a semiconductor acceleration detecting device comprising: an acceleration detecting beam which includes a diaphragm carrying a gauge resistor that is part of a bridge circuit; a substrate; and lead pins supporting the acceleration detecting beam and fixed to the substrate, the lead pins being in direct electrical connection with the bridge circuit for direct input and output of electrical signals to and from the bridge circuit.

The above and other objects, features and advantages of the present invention will become clear from the following description of the preferred embodiment taken in conjunction with the accompanying drawings.

DESCRIPTION OF THE PREFERRED EMBODIMENTS

Figure 1:
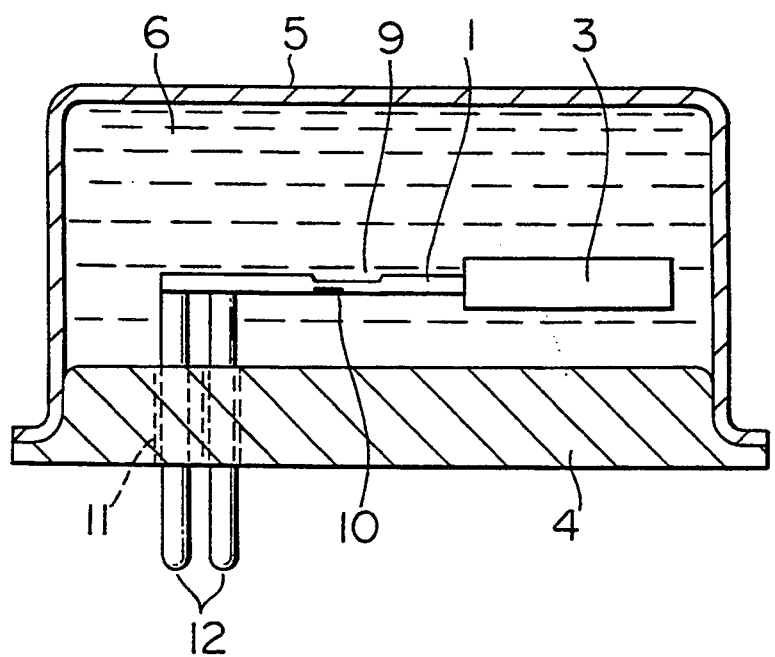
FIG. 1 is a sectional side view of a semiconductor acceleration detecting device according to an embodiment of the present invention.
Figure 2:
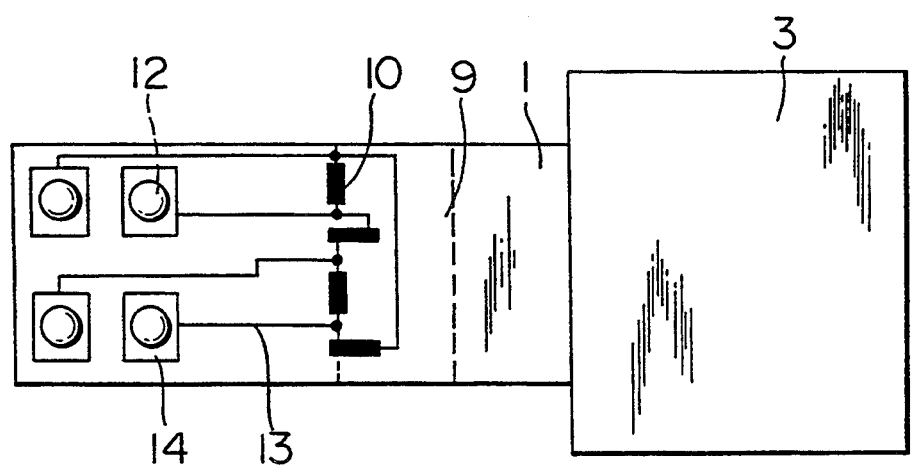
FIG. 2 is a plan view of an acceleration detecting beam incorporated in the semiconductor acceleration detecting device shown in FIG. 1.
Figure 3:
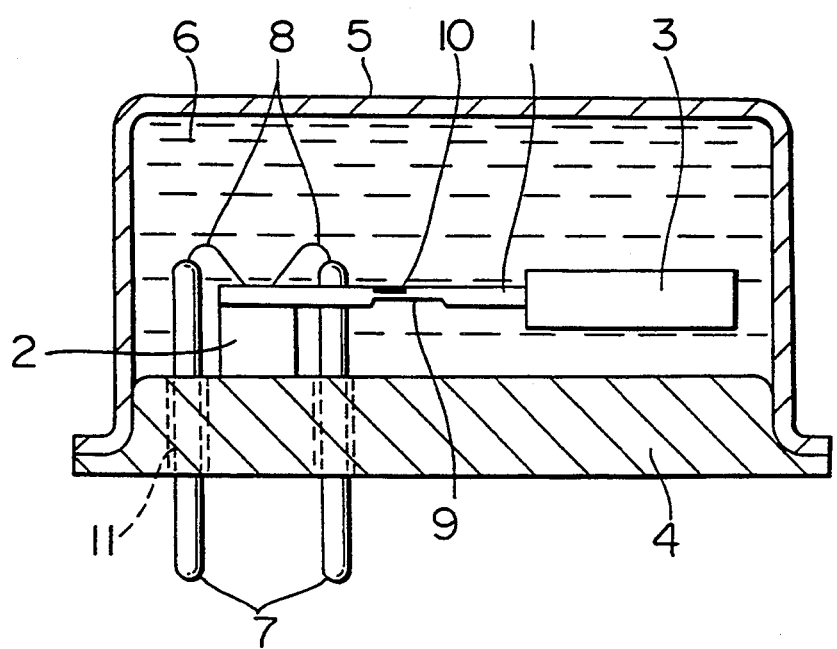
FIG. 3 is a sectional side view of a known semiconductor acceleration detecting device.

An embodiment of the present invention will be described with reference to the accompanying drawings. FIG. 1 is a sectional side view of a semiconductor acceleration detecting device as an embodiment of the present invention, while FIG. 2 is a plan view of an acceleration detecting beam incorporated in the semiconductor acceleration detecting device shown in FIG. 1. In these figures, the same reference numerals are used to denote the same parts or components. Referring to these figures, an acceleration detecting beam 1 is supported at one end by a plurality of lead pins 12 which are fixed to a substrate 4 through insulating members 11 made of an insulating material such as a glass. In the illustrated embodiment, there are four lead pins 12, corresponding to input, output, plus and minus signals. Thus, the four lead pins 12 cantilever the acceleration detecting beam 1 in such a manner as to enable direct input and output of electrical signals. These lead pins 12 are fixed to aluminum pads 14 embedded in the acceleration detecting beam 1, by, for example, soldering. The aluminum pads 14 are connected to the gauge resistor 10 through electric lines 13.

In the semiconductor acceleration detecting device having the described construction, the acceleration detecting beam 1 is resiliently flexed when an acceleration is applied to the device, so that the resistance value of the gauge resistor 10 is changed due to the piezoresistive effect, with the result that an imbalance is caused in the bridge circuit containing the gauge resistor 10, whereby an electrical signal indicative of the acceleration is obtained.

In the acceleration detecting device of the present invention having the described construction, the acceleration detecting beam 1 is cantilevered by the lead pins 12 which are directly connected to an input/output portion of the acceleration detecting device, so that input and output of electrical signals can be accomplished without using any wire. Thus, the semiconductor acceleration detecting device of the present invention is devoid of the base and wire which are used in the conventional semiconductor acceleration detecting device. Consequently, the number of the parts or components is reduced to facilitate the assembly of the acceleration detecting device. Furthermore, the durability and reliability of the semiconductor acceleration detecting device are improved by virtue of elimination of the connecting wires.

As will be understood from the foregoing description, the present invention provides a semiconductor acceleration detecting device which can easily be assembled at lower cost because of the reduced number of parts or components and which can operate with higher degree of reliability owing to the elimination of use of wires which are employed for the connection between the acceleration detecting beam and lead pins in the conventional semiconductor acceleration detecting device.

What is claimed is:

1. A semiconductor acceleration detecting device comprising:

an acceleration detecting beam having opposed first and second ends and including a flexing diaphragm intermediate the first and second ends on which a gauge resistor is disposed, said gauge resistor being connected to a bridge circuit;

a substrate; and lead pins contacting and supporting the first end of said acceleration detecting beam and fixed to said substrate, said lead pins being directly electrically connected to said bridge circuit for input and output of electrical signals to and from said bridge circuit, the second end of said acceleration detecting beam being free to move in response to applied accelerations, thereby flexing said flexing diaphragm.

2. The semiconductor acceleration detecting device according to claim 1 comprising a cap fixed to said substrate covering said acceleration detecting beam, and an oil filling the cavity between said substrate and said cap.

3. The semiconductor acceleration detecting device according to claim 1 comprising a weight attached to an end of said acceleration detecting beam opposite the end supported by said lead pins.

* * * * *